July 24, 1956  T. RUSSELL  2,755,684
COMBINATION HAND AND FOOT CONTROLLED GAS
THROTTLE OPERATING PEDAL MECHANISM
Filed March 13, 1953  2 Sheets-Sheet 1
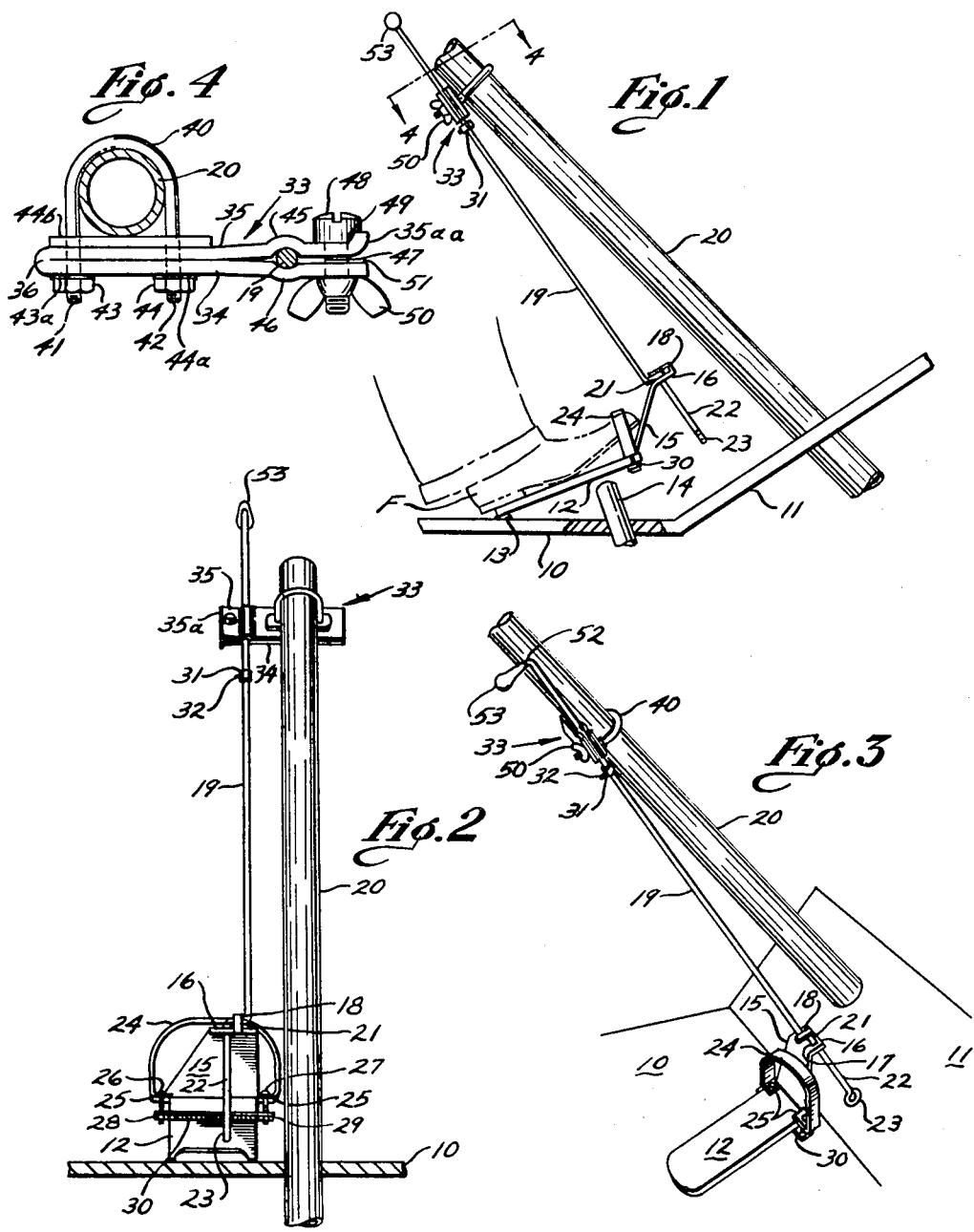
INVENTOR.
THEODORE RUSSELL
BY
H. G. Manning
ATTORNEY July 24, 1956
T. RUSSELL
2,755,684
COMBINATION HAND AND FOOT CONTROLLED GAS
THROTTLE OPERATING PEDAL MECHANISM
Filed March 13, 1953
2 Sheets-Sheet 2
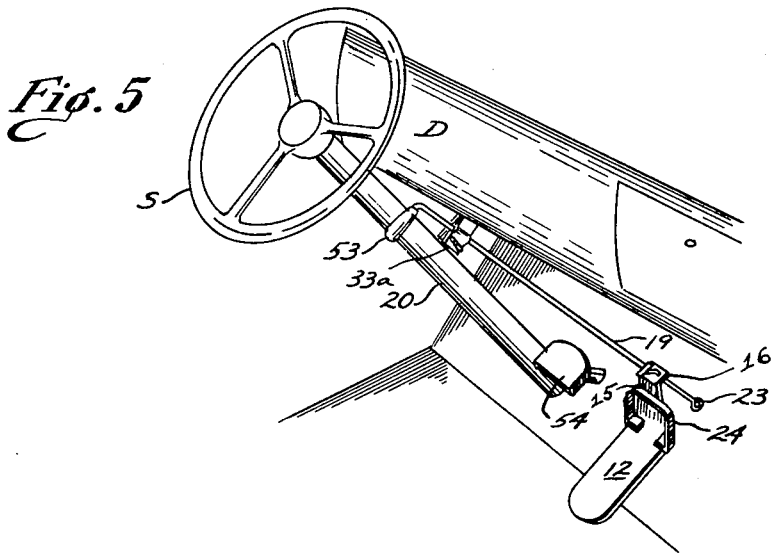
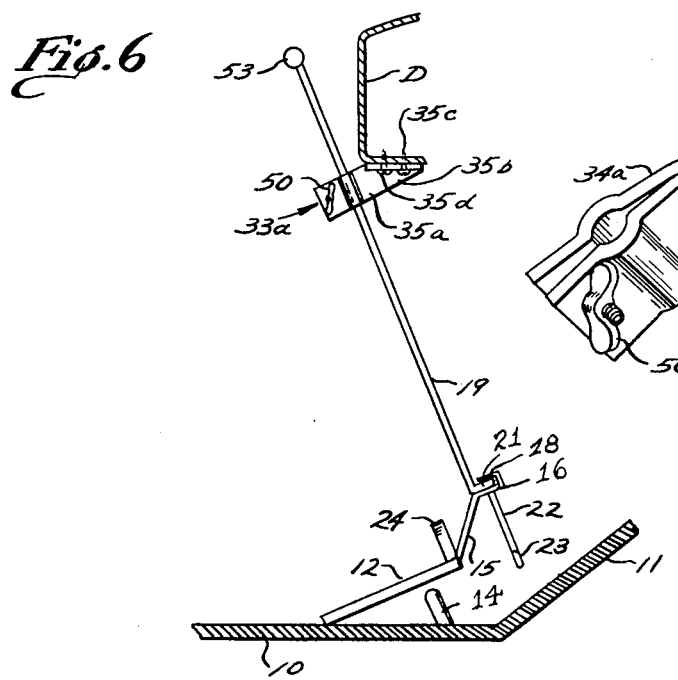
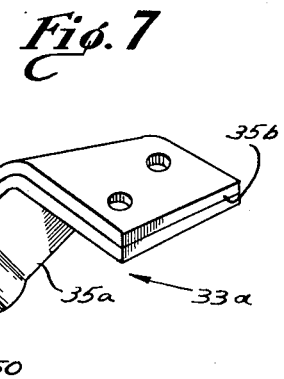
INVENTOR.
THEODORE RUSSELL
BY H. G. Manning
ATTORNEY

United States Patent Office 2,755,684
Patented July 24, 1956

2,755,684

COMBINATION HAND AND FOOT CONTROLLED GAS THROTTLE OPERATING PEDAL MECHANISM

Theodore Russell, Naugatuck, Conn.

Application March 13, 1953, Serial No. 342,079

13 Claims. (Cl. 74—482)

This invention relates to automotive equipment, and more particularly to an apparatus whereby the gas throttle pedal of a motor vehicle may be selectively controlled either by the hand or foot of the driver.

One object of the present invention is to provide an apparatus of the above nature in which the pedal may be held by a friction bracket in any desired adjusted position.

A further object is to provide an apparatus of the above nature in which the pedal is provided with a toe strap to permit easy raising of the same by the foot.

A further object is to provide an apparatus of the above nature in which the engine may be allowed to idle and warm up and in which the battery may be charged without manual attention.

A further object is to provide a device of the above nature in which the hands of the driver may be left entirely free to operate the steering wheel, and the gas pedal may be operated by the foot of the operator.

A further object is to produce an apparatus of the above nature which will permit the driver to use his left foot for operating the brake pedal, thus giving greater driving control and avoiding the necessity of shifting the right foot from the gas pedal to the brake pedal when driving the vehicle.

A further object is to provide an apparatus of the above nature which will relieve the driver's right leg and foot from fatigue, inasmuch as the gas pedal may be allowed to remain at any desired adjusted position without pressure of the foot thereon.

A further object is to provide an apparatus of the above nature in which the control rod will be frictionally connected to the gas pedal and may be locked thereto by twisting a handle on said rod, causing a shoulder on the rod to interlock with a hook on said pedal.

A further object is to provide an apparatus of the above nature which will be simple in construction, inexpensive to manufacture, easy to install and manipulate, compact, ornamental in appearance, and very efficient and durable in use.

With these and other objects in view, there has been illustrated on the accompanying drawings, two forms in which the invention may conveniently be embodied in practice.

In the drawings:

Fig. 1 represents a side view of the apparatus, with a section being taken through the floor board of the motor vehicle.

Fig. 2 is a front view of the same.

Fig. 3 is a perspective view of the apparatus showing the control rod as it appears when interlocked with the pedal.

Fig. 4 is a top view of the steering column shown in section, and the friction bracket which is tightly clamped upon the control rod.

Fig. 5 is a perspective view of a modified form of the apparatus having a friction bracket which is attached to the dashboard instead of to the steering post.

Fig. 6 is a side view of the same, with the dashboard shown in cross section.

Fig. 7 is a perspective view of the modified form of friction bracket shown by itself.

Referring now to the drawings in which like reference numerals denote corresponding parts throughout the several views.

The numeral 10 indicates a horizontal floor board, and the numeral 11 an inclined floor board located in front of the driver's seat.

The numeral 12 indicates a gas pedal which is adapted to be controlled by the driver's foot F, said pedal being connected to the floor board 10 by a hinge 13 having an upwardly pressing spring, not shown.

Beneath the pedal 12, provision is made of an accelerator plunger 14 for controlling the supply of gas to the automotive engine.

At the front upper end of the pedal, provision is made of an inclined extension member 15, which terminates in a bent end section 16 having an aperture 17 for receiving an upstanding control rod 19 the upper end of which is adjustably supported on the steering post 20, by means of a clamping member 33 to be hereinafter described.

The rod 19 is provided near its lower end with a shoulder 21 which is adapted to interlock with a hook 18 on the top of the horizontal section 16 of the pedal extension 15, and said rod has a depending section 22 terminating in a bottom stop eye 23, as clearly shown in Figs. 1, 2, 3 of the drawing.

The pedal 12 is also provided with an upper toe strap 24 having an oval top section and a pair of inturned feet 25, 25 at the bottom thereof, which are secured, as by a pair of bolts 26 and 27, and nuts 28 and 29, to an apertured bottom plate 30 located underneath the pedal 12.

At an intermediate point on the length of the rod 19, provision is made of a stop collar 31 secured to said rod by means of a set screw 32.

The rod clamp 33 controls the friction exerted upon the rod 19 for holding it in any desired adjusted position, and comprises a pair of side plates 34 and 35 as clearly shown in Fig. 4.

The side plate 35 is provided with an outturned lip 35aa for detachably engaging within a side recess 49 of the head of a screw 47 which passes through aligned apertures in the end of said plates 34, 35.

The rear of the plates 34 and 35 are secured together integrally by a connecting end 36, and said plates are provided with apertures for receiving the screw 47, and a pair of threaded sections 41, 42 of a U-shaped rod 40, said sections 41, 42 being secured to the plate by means of nuts 43, 44 and washers 43a, 44a. Provision is also made of a short plate 44b located between the steering post 20 and the plate 35. The plates 34, 35 are also provided with concave recesses 45, 46 to fit around the adjustable control rod 19. A wing nut 50 is mounted upon the threaded end of the screw 47 for adjusting the friction of the clamp upon said rod. At the top of the control rod 19 provision is made of a side bent section 52, having a handle 53 connected therewith.

*Operation*

In the operation of the first form of the invention shown in Figs. 1–4, the handle 53 located upon the end of the rod 19 will be manipulated to cause said rod to slide in the friction bearing between the recessses 45 and 46 of the plates 35, 34 whereby the gas pedal 12 may be depressed toward the floor-board 10. The pedal 12 will remain in this position until it is selectively pulled upwardly either by the handle 53 or by the engagement of the toe of the operator's foot F which fits loosely within the oval strap 24 secured to the end of said gas pedal 12.

Since the lower portion of the control rod 19 is provided with a shoulder 21, it will be possible to interlock the rod to the pedal by twisting the rod 19 by means of the handle 53 in such a manner that the shoulder 21 engages under the hook 18. The rod 19 may thus be pulled up until the stop collar 31 strikes the clamp 33, which has been previously adjusted in any desired position, along the rod.

By means of this construction, complete control of the gas pedal 12 by the right foot of the operator will be permitted, allowing the operator to have his hands free to turn the steering wheel S and allowing him to operate the brake pedal with his left foot. In traffic, the shoulder 21 may be disengaged from the hook 18 by turning the handle 53 in the opposite direction.

It will be understood that the wing nut 50 permits an accurate minute adjustment of the pressure of the friction clamp on the rod 19.

Among the advantages of the present invention are:
1. Safety in starting the car on hills.
2. The engine may be allowed to idle when the car is at a standstill without attention by the operator, and to permit the engine to warm up or charge the battery without danger of stalling.

*Modified form*

In case the gas pedal 12 is located at a point remote from the steering post, use may be made of a modified form of clamp 33 (Figs. 5–7), having plates 34a, 35a. The plate 35a has forwardly bent section 35b which is attached by screws to the dashboard D instead of to the steering post. In other words, the construction of the friction clamp 33a is almost identical with that of the first form of clamp 33. The brake pedal is indicated by the numeral 54.

While there have been disclosed in this specification two forms in which the invention may be embodied, it is to be understood that these forms are shown for the purpose of illustration only and that the invention is not to be limited to the specific disclosures but may be modified and embodied in various other forms without departing from its spirit. In short, the invention includes all the modifications and embodiments coming within the scope of the following claims.

Having thus fully described the invention what is claimed as new, and for which it is desired to secure Letters Patent is:

1. In an automotive vehicle, a gas pedal, a loop shaped strap rigidly connected to the front of said pedal for receiving the toe of the operator's foot, said pedal also having an inclined forward extension for guiding and engaging an upstanding control rod having a manipulating handle on the upper end thereof, and an adjustable clamping member, frictionally embracing said control rod for varying the friction thereon, so as to permit said pedal to remain in any desired adjusted position without attention by the operator.

2. The invention as defined in claim 1, in which said control rod is provided with a shoulder adjacent the position of said inclined extension, and said extension has a hook under which said shoulder is adapted to engage to detachably hold said rod to said extension and permitting the gas pedal to be operated solely by the foot of the operator if desired, leaving his hands free for manipulating the steering wheel.

3. The invention as defined in claim 1, in which the control rod is provided with a stop member for engaging said adjustable clamping member to limit the upward movement of the pedal.

4. The invention as defined in claim 1, in which said rod is provided with a stop collar located adjacent and below the clamping member for limiting the upward movement of said pedal.

5. The invention as defined in claim 1, in which said adjustable clamping member comprises a pair of side plates and a wing nut-operated headed screw to control the pressure of said plates upon said rod.

6. The invention as defined in claim 1, in which said clamping member is secured to the steering post of said vehicle by a U-shaped rod passing through said clamping member and secured thereto by a pair of nuts screwed upon the threaded ends of said U-shaped rod.

7. The invention as defined in claim 5, in which said clamping member plates are provided with inwardly concave recesses frictionally embracing said control rod.

8. The invention as defined in claim 5, in which said clamping member plates are rigidly connected together at one end and are spaced apart at the other end beyond the control rod so as to facilitate the clamping thereof upon said rod by a headed screw.

9. The invention as defined in claim 5, in which one of said clamping member plates is provided with a lateral extension fitted into a recess in the head of said screw.

10. In an automotive vehicle, a gas pedal, means secured to said pedal for embracing the toe of the operator's foot, an upstanding pedal control rod passing through the forward part of said pedal and being guided thereby, a two-part clamping member embracing said rod, secured to the dashboard of said vehicle, and means to adjust the friction of said clamping member on said rod.

11. In an automotive vehicle having a foot-operated gas pedal, the combination including a movable control member attached to the gas pedal, means to adjust the longitudinal position of said control member, a handle on the upper end of said control member adjacent the hand of the vehicle operator, friction means to hold said member in any adjusted position, and a member to be attached to said gas pedal to extend over the foot of the vehicle operator to enable the operator to raise the pedal by his foot.

12. The invention as defined in claim 11, including separable connecting means to attach said control member to said pedal.

13. The invention as defined in claim 12, wherein said separable connecting means includes an element to be engaged or disengaged by the rotation of said handle.

References Cited in the file of this patent
UNITED STATES PATENTS

| | | |
|---|---|---|
| 1,387,775 | Headley | Aug. 16, 1921 |
| 1,681,380 | Taman | Aug. 21, 1928 |
| 2,489,727 | Shipley | Nov. 29, 1949 |